United States Patent [19]

Civardi

[11] 4,311,745
[45] Jan. 19, 1982

[54] LAMINATING

[75] Inventor: Frank P. Civardi, Wayne, N.J.

[73] Assignee: Inmont Corporation, Clifton, N.J.

[21] Appl. No.: 97,174

[22] Filed: Nov. 26, 1979

Related U.S. Application Data

[63] Continuation of Ser. No. 834,857, Sep. 19, 1977, abandoned.

[51] Int. Cl.³ .............................................. B32B 31/26
[52] U.S. Cl. ..................................... 428/91; 156/82;
156/153; 156/232; 156/246; 156/322; 428/95;
428/151; 428/218; 428/904; 428/309.9;
428/315.9; 428/311.1; 428/316.6
[58] Field of Search ................. 156/82, 232, 235, 237,
156/238, 246, 321, 322, 153; 428/85, 86, 91, 95,
198, 304, 305, 310, 315, 317, 320, 321, 96, 151,
218, 289, 290, 311, 904

[56] References Cited

U.S. PATENT DOCUMENTS

| | | | |
|---|---|---|---|
| 3,098,262 | 7/1963 | Wisotzky | 156/245 |
| 3,239,399 | 3/1966 | King | 156/82 |
| 3,425,882 | 2/1969 | McConnell et al. | 156/82 |
| 3,764,363 | 10/1973 | Civardi et al. | 428/305 |
| 3,821,012 | 6/1974 | Lattarula et al. | 428/315 |
| 3,850,725 | 11/1974 | Spielau et al. | 156/322 |
| 3,873,406 | 3/1975 | Okazaki et al. | 156/237 |
| 3,885,074 | 5/1975 | Chandler | 428/136 |
| 3,988,488 | 10/1976 | Civardi | 428/91 |
| 4,028,161 | 6/1977 | Fukushima et al. | 156/153 |
| 4,055,693 | 10/1977 | Civardi | 428/95 |

OTHER PUBLICATIONS

Flame Bonding Fur Laminates", Textile Chemist and Colorist Maynard B. Brodbeck, 1969, pp. 613-618.
"Sharnet 100 Nonwoven-For Bonding Nonwovens-for Fabric Adhesion", B. F. Goodrich Chemical Co.

Primary Examiner—Caleb Weston
Attorney, Agent, or Firm—Michael R. Chipaloski; Abner Sheffer

[57] ABSTRACT

Microporous polymeric material such as elastomeric polyurethane laminated to fibrous fabric by fusing projections integrally formed on such microporous material the projections being spaced or in an open pattern. The lamination may be effected by applying a flame to the projections or by otherwise supplying heat thereto to make them tacky and then pressing the fabric and tackified projection-carrying surface against each other to embed surface fibers of the fabric into the spaced tacky material.

16 Claims, 17 Drawing Figures

|←— 0.5mm —→|

FIG. 6

|←— 0.05mm —→|
(50μ)

|←— 10μ —→|

FIG. 13B

|←— 100μ —→|

LAMINATING

This is a continuation, of application Ser. No. 834,857 filed Sept. 19, 1977 abandoned.

This invention relates to the production of laminates of flexible microporous materials (such as microporous elastomeric polyurethane) and fibrous fabrics, particularly suitable for leather replacements for shoe uppers. Laminates of this general type are known in the art; see, for instance, U.S. Pat. Nos. 3,988,488, 3,873,406, 3,843,436.

This invention is especially useful for making laminates of those microporous materials which are made of elastomeric polyurethanes and which are conventionally used in shoe uppers, e.g. flexible materials having a high water vapor permeability and a strength and texture suitable or receiving a leather-like finish. See, for instance, British Pat. No. 1,122,804, which discloses the production of such materials by coagulation and leaching of a solution of the polyurethane containing a removable filler.

One aspect of this invention relates to the use of flame-bonding for making such laminates. The bonding of polyurethane foams to fibrous fabrics by flame lamination is well known in the art; see, for instance, the article entitled "Flame Bonding for Laminates" in Textile Chemist & Colorist 1 (27) 613-618 (1969). Attempts at using the flame bonding technique to laminate fibrous fabrics to these microporous polyurethane sheet materials have not given good results in that the laminates showed such defects as weak bonding and/or considerably lowered moisture vapor transmission and marked loss of thickness of microporous layer. I have found that these defects can be overcome in the process by applying the flame to a surface of the microporous layer which has small spaced projections of elastomeric polyurethane. (Such small spaced projections may be formed during the manufacture of the microporous material, as described in Warwicker et al U.S. Pat. No. 3,860,680 and discussed in Example 5 of my U.S. Pat. No. 3,988,488.) While the reasons for this improvement are not fully understood, I believe that the superior results may be attributed to the fact that the flame bathes a zone of polyurethane which, because it is in the form of spaced projections, has an effective specific gravity which is much lower than that of the main body of the material being treated (e.g. for a depth of 0.1 mm or more the material being flamed has an effective specific gravity below 0.2 such as 0.15 or 0.1 or even less, as compared to a specific gravity of more than 0.3 for the material of the projections themselves) and that the low density material on fusing and being pressed against the fibrous material (so as to embed, wholly or partially, surface fibers thereof), gives the desired strong bond, without forming a continuous dense fused layer of low moisture vapor permeability.

Figure 1:
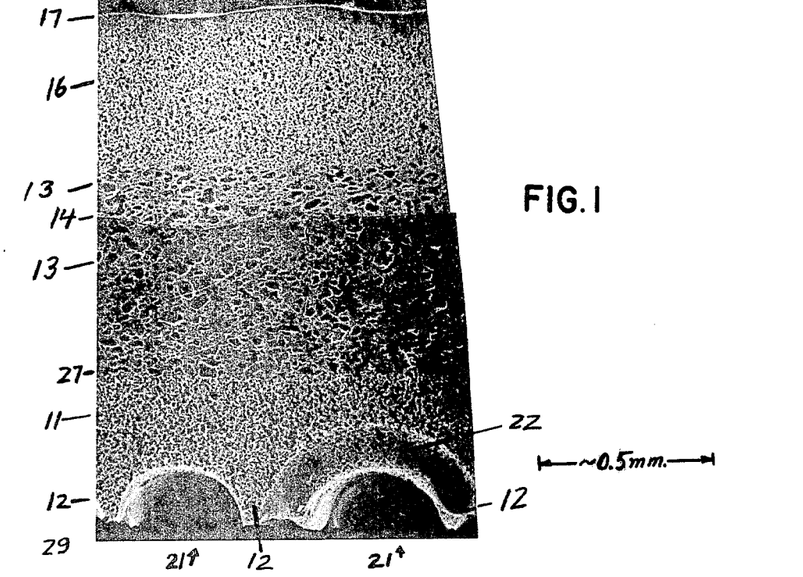

The spaced projections which provide the low density zone preferably are of a material having a microporous structure. While they are most conveniently formed as a replica of a woven fabric supporting belt pattern during the making of the microporous sheet, they may be made in other ways, such as by mechanically removing material from the flat surface of the microporous sheet to produce a scored pattern. The projections may be of such form that their effective cross-sectional area (and specific gravity) increases continuously as one measures further beneath the outer boundary of the projections (as shown in FIG. 1), or they may be of uniform cross-sectional area along their depth (e.g. cylindrical projections extending normal to the surface). They are closely spaced; the gaps between adjacent projections are all desirably well below 15 mm and preferably well below 10 mm. Their heights are preferably over 0.1 mm such as about 0.15, 0.2 or 0.25 mm or more. Instead of being separate and spaced the projections which provide the low density zone may be joined to form a continuous open pattern whose gaps (open spaces) measure well below 15 mm and preferably well below 10 mm across. The spaces in either case usually measure at least 0.1 mm across, such as 0.2 mm or more, and the projections usually have widths of at least 0.1 mm such as 0.7 mm or more.

It is advantageous to use, as the material of the projections, a polymer whose melting point is below about 180° C., such as about 175° or even 150° C. For many uses, the polymer making up the main body of the microporous layer is desirably a particularly tough strong polymer having a relatively high melting point (above 180° C. such as about 190° or 200° or 210° C.); in such cases, for instance, one may use a multilayer microporous material whose main body is largely of the higher melting material and whose projections are of the lower melting material.

In another aspect of this invention the microporous material having the spaced or open-pattern projections discussed above, may be heat-laminated to the fibrous fabric without a flame. Thus heat may be supplied to these projections (so that their material fuses under pressure) from preheated fabric and/or the heat may be transmitted through the fabric to the projections, the fabric and heat-activated projections being then pressed together to embed surface fibers of the fabric into the spaced fused projections, as discussed, for instance, in Example 2 below.

In the accompanying drawings,

FIGS. 1, 2, 5-13 are photomicrographs with an electron scanning microscope, the approximate scale being indicated thereon.

FIG. 1 shows a cross-section of a microporous material having spaced projections on one surface thereof, FIG. 2 is a view of the surface having the projections, taken at an angle of about 45° to the surface.

FIGS. 5, 6 and 7 are cross-sections at different magnifications of the bonding zone of a laminate made as in Example 2.

FIG. 8 is a schematic view of a laminating apparatus used in Example 3.

FIGS. 9, 10 and 11 are cross-sections at different magnifications of the bonding zone of a laminate made as in Example 3.

FIGS. 12, 12A, 12B and 13, 13A, 13B are views of the bonding zones of the laminates of Examples 3 and 2 respectively, after the fibrous surface of the laminate has been scraped repeatedly with the end of a flexible razor blade until almost all of the fibrous layer has been removed.

The following examples are given to illustrate this invention further. In this application all proportions are by weight unless otherwise indicated.

EXAMPLE 1

Figure 2:
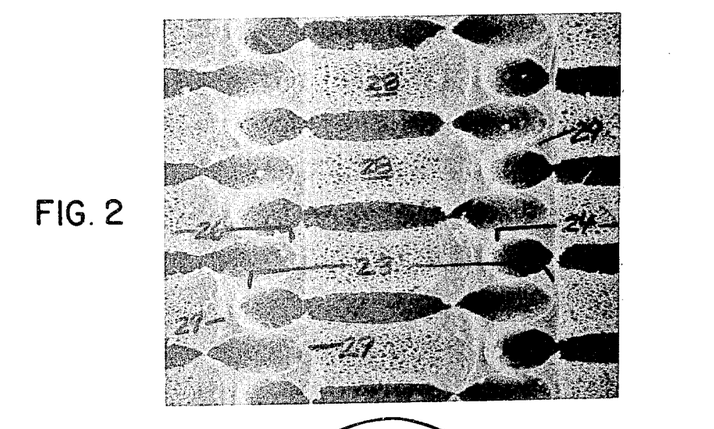
Figure 3:
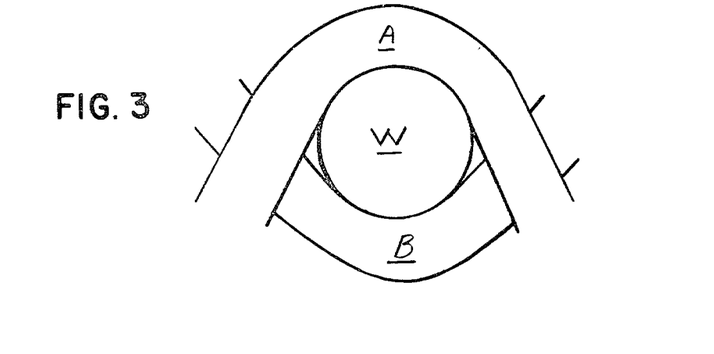

Apparatus like that described in U.S. Pat. No. 3,860,680 is used, with three paste-extruding dies instead of two, to form a microporous product having three layers (which are seen in cross-section in FIG. (1): (a) a lower layer 11 having narrow elongated projections 12 resulting from partial penetration of the paste into a belt which serves as a temporary support during the coagulation process; (b) a middle layer 13 (the uneven light-dark change indicated at 14 is an artifact resulting from combining two photographs, having slightly different exposures, to form the montage shown in FIG. (1): and (c) a top layer 16. The polyurethane of the lower layer (and of the top layer has a lower melting point than the polyurethane of the middle layer, and the density of the lower layer (and of the top layer) is less than that of the middle layer. After coagulation the product is dried and surface-finished and embossed to give it an embossed skin 17 having a leather grain surface finish. The paste which forms the lower layer is extruded at such a rate, and the degree of penetration onto the belt is controlled (as described in U.S. Pat. No. 3,860,680) so that the lower layer, in this particular case, barely covers the highest portions of the belt. The pattern of the belt-formed projections is seen in FIGS. 1 and 2, and a cross section of the belt is shown schematically in FIG. 3. In FIG. 1 the spaces 21 are formed by the parallel warp wires W of the woven wire belt on which the product is formed, while the arc 22 is a depression formed by a weft wire, which runs transverse to the warp wires of the belt and is interlaced with these warp wires, in a plain ("one up and one down") weave, in which there are two sets of weft wires A and B (FIG. 3), all the wires of each set being parallel to each other. (The diameters of the wires are about 17 mils (warp), 8 mils (weft) and there are about 36 warp wires per inch and about 68 weft wires per inch). Thus, behind the plane of FIG. 1 there is another arcuate depression of the same shape as the depression 22 but in staggered relation thereto. In FIG. 2 one row of such arcuate depressions, formed by the first set of spaced parallel weft wires, is in the zone indicated by the brackets 23, while the end of another row of such depressions, formed by the second set of the spaced parallel weft wires is indicated by brackets 24, and the beginning of still another row formed by said second set of weft wires is indicated by brackets 26. The plane of the cross-section shown in FIG. 1 is not precisely through the axis of the arcuate wire-formed depression 22 and FIG. 1 thus does not show the full depth of that depression; at its deepest the depression extends closer to the boundary 27 between the lower melting layer and the next layer. The zones indicated as 28 in FIG. 2 are depressions corresponding to spaces 21 of FIG. 1 (they are formed by a single warp wire). The proportion of voids represented by the wire-formed spaces varies, of course, depending on the depth (measured into the material, i.e., upward in FIG. 1, from the outer "lower" tips 29 of projections 12) at which that proportion is measured. That is, in the embodiment shown in FIG. 1 the void proportion varies continuously inversely with the depth and the overall density (specific gravity) varies continuously directly with depth. For instance, in FIG. 1 the projections 12 are seen to extend for a depth of about $\frac{1}{4}$ mm; at that depth the specific gravity is practically that of the microporous material of the projections themselves (i.e., about 0.3 to 0.35, e.g. 0.32). At a depth of, say, about $\frac{1}{8}$ mm the wire-formed void proportion is in the neighborhood of 50% and the overall specific gravity at that $\frac{1}{8}$ mm depth is thus in the neighborhood of 0.1 to 0.15 or 0.2. At lesser depths the overall specific gravity is clearly still lower. In contrast the specific gravity of the second layer 13 is over 0.4 (e.g. 0.43 or about 0.5).

The lower layer is light brown in color (about $\frac{1}{2}$% carbon black is dispersed in its polyurethane. The microporous material of the lower-melting point layer 11 (and also of the top layer 16) melts at about 174° C. and becomes tacky under pressure at about 167° C. The middle layer microporous material melts at about 195° C. and becomes tacky under pressure at about 188° C. These measurements are made by placing one or more small pieces of the materials (e.g. of $\frac{1}{2}$ mm diameter) between two flat glass slips and placing the resulting assembly on a Fisher-Johns melting point block having a controlled temperature, increasing the temperature gradually while observing the specimen under a magnifying glass and pressing against the top piece of glass intermittently (e.g. with a pencil). At temperatures below the tackiness point the glass will rebound after being pressed down; at the tackiness point it will not (at that stage the internal surfaces of the voids in the microporous material presumably have softened enough to stick to each other under pressure with attendant at-least-partial collapse of the porous structure). At the melting point the material is seen to change appearance and spread or flow.

Further details as to the production of the polyurethanes (and pastes thereof) used in making the microporous material are found in U.S. Pat. No. 3,968,292. Thus the bottom layer having the projections may be made of the same material as is used for the "fleshcoat layer" in 3,968,292, and the middle layer and top layer may be made of the same materials as are used for the "substrate layer" and "top-coat layer" of that patent.

EXAMPLE 2

Figure 4:
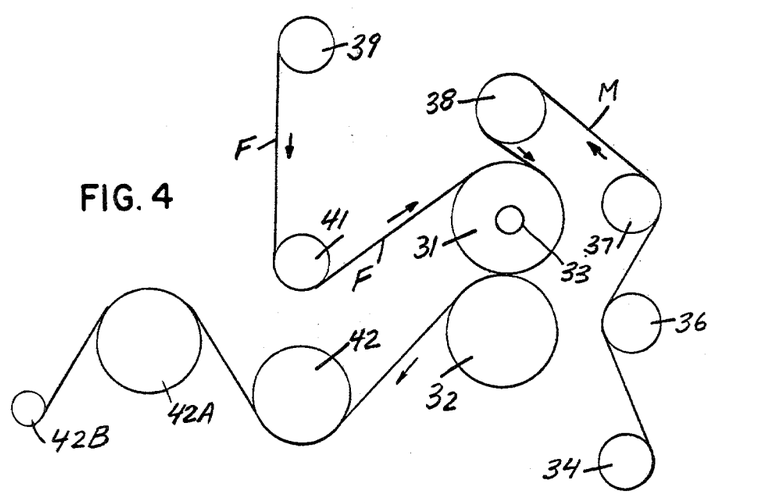
FIG. 4 is a schematic view of a laminating apparatus used in Example 2.

The microporous sheet material produced in Example 1 is laminated to a layer of fibrous fabric using apparatus illustrated in FIG. 4. In this apparatus the fibrous fabric F is preheated and, while the hot fabric is on a hot roll, the microporous sheet material M is brought into contact with the fabric and pressed against it, so that softening of the polymer of the projections 12 occurs owing to heat transfer through the fabric and the thus-tackified polymer is deformed around fibers of the fabric. Then the laminate is cooled while avoiding small-radius changes in direction (which could exert delaminating forces before the bond between the fibers and the polymer has been set by cooling). In the illustrated apparatus the hot roll is an 8½ inch diameter steel idler roll 31, internally heated with hot oil, and the fabric and microporous material are pulled onto this hot roll by the force exerted (on the assemblage of fabric and microporous material) by a 10 inch diameter driven rubber backup roll 32 (whose rubber surface has a Shore A hardness of about 80) which is in contact with the layer of microporous material. The hot roll 31 is mounted for free rotation on an adjustable support 33 which can be raised or lowered to open or close the nip between hot roll 31 and backup roll 32 to the desired degree. More particularly, the microporous sheet material (wound on a roll 34) is drawn off over a five inch diameter slotted expander idler roll 36 (which functions to avoid creasing or wrinkling), then over an idler roll 37 and a 4½ inch diameter idler roll 38 (adjustably mounted about 1 cm from the surface of the heated roll 31) and then onto the fibrous fabric F which is supported on that treated roll 31. At the same time the fibrous fabric is unwound from its supply roll 39, passed over idler roll 41 and uppers are very pliable and free of the "orange-peel" effects or "show through" found in other lasted uppers of leather-substitute laminates.

Figures 12, 12A, 13, 13A:
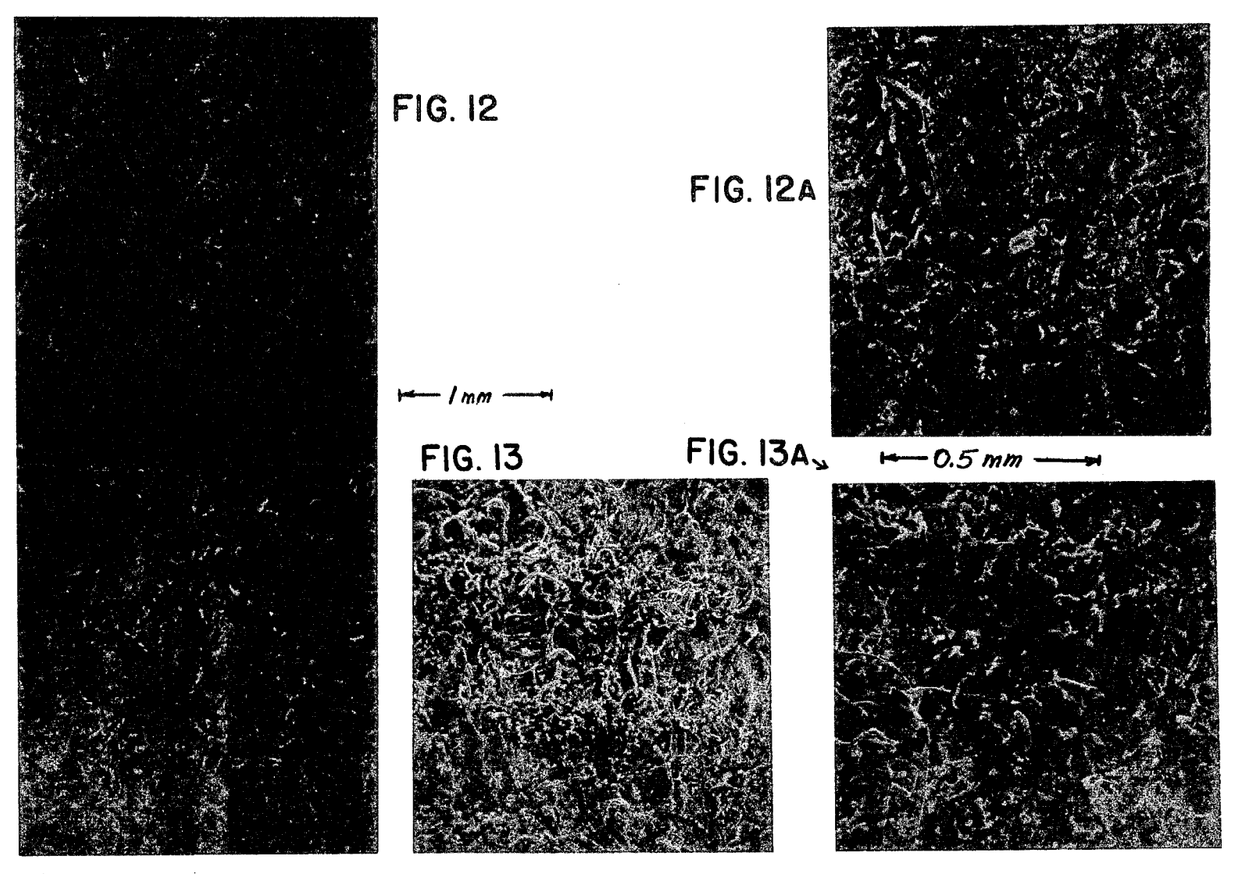

When a portion of the fibrous surface of the laminate of this Example 3 is scraped repeatedly with the edge of a flexible razor blade to such an extent as to remove most of the fibers (which are black) the pattern of the projections 12 is still visible to the naked eye (and more clearly when viewed at 8× magnification) in that there is a distinct pattern of black lines corresponding to the lines (see FIG. 2) formed by the tips 29 of the projections and the original brown color of the microporous material is visible between those black lines. The material of Example 2 shows the same kind of pattern when treated in that way. See FIGS. 12 and 13. In FIG. 12 (a view taken at an angle to the surface) there are portions (e.g. at the top) which did not get so much scraping, and there are also more thoroughly scraped portions (as at lower left). It will be seen that the fibers are tightly bonded at local fused zones (which follow the pattern of the projections), and there are substantially unfused microporous surfaces between those fused zones. This is even more evident in the views at higher magnifications, FIGS. 12A and 12B. In FIG. 13 (taken at an angle as in FIG. 12) the less scraped portion is at the upper left; the distinctions between fused fiber-locking zones and substantially unfused microporous surfaces are similarly more evident in the views at higher magnification, FIGS. 13A and 13B.

In the foregoing Examples 2 and 3 the fibrous material is an interlaced nonwoven fabric produced by entangling fibers with water jets, the fabric being held together solely by the fiber to fiber friction. It is of course within the scope of the invention to use other fibrous fabrics, including those in which there is binder present (e.g. in amount of 2 to 40%) to aid in bonding the fibers of the fabric together (e.g. a nonwoven fabric whose fibers have been treated with a latex of an elastomer, such as butadiene-acrylonitrile copolymer, as is well known in the art). The fibers of the nonwoven fabric may be interlaced in other ways, as by needle-punching; also the fibers may be interlaced into a woven or knitted fabric (e.g. two layers of a nonwoven fibrous structure may be needle punched through a central reinforcing scrim, open weave, fabric). The fibrous fabric may be woven or knitted (e.g. of multifiber yarns) and in that case it is desirable that the fabric face being laminated have exposed individual fibers or small groups of fibers which can become embedded in the fused projections of the microporous material; thus a surface of a woven fabric may be sanded, or otherwise treated, to raise a light nap of spaced individual fibers thereon. A fabric of the type described in U.S. Pat. No. 3,988,488 having a bonded cap (on the side opposite that facing the microporous layer) may be employed; here again it may be desirable to nap, at least lightly, the un-napped face (FIG. 5 of U.S. Pat. No. 3,988,488) before laminating, so as to facilitate embedment of fibers into the fused projections. The fabric is preferably such as to impart additional strength to the microporous material, or in some cases to provide the principal tensile strength of the laminate. Preferably also its presence imparts to the laminate a higher tangent modulus at 20% elongation, a property which I have found to be significant in the consistent lasting of the shoe uppers.

Figure 12B:
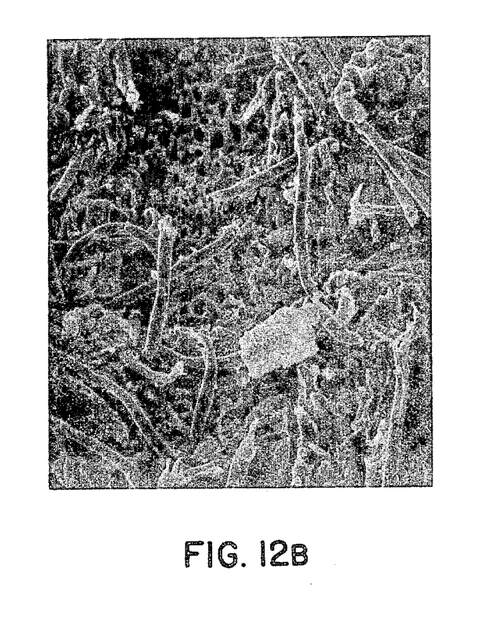
Figure 13B:
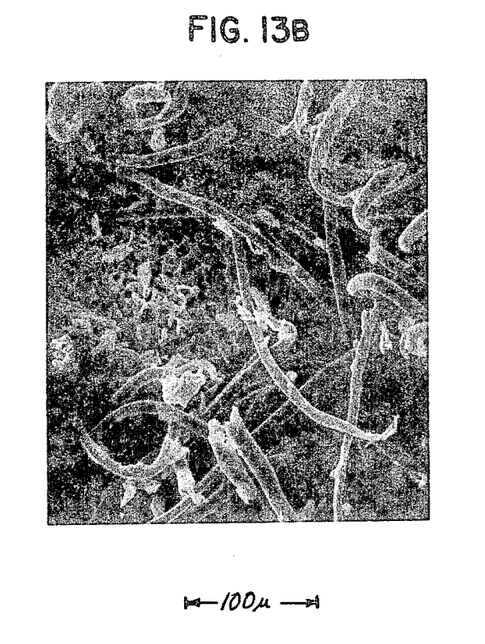

One type of preferred fabric is nonwoven structure of entangled individual fibers (e.g. of about 1 to 5 denier) having a high degree of "vertical" entanglement and interlocking (which is produced by needling a batt of staple fibers, either by the use of solid needles, usually having fiber-moving barbs, as in U.S. Pat. Nos. 3,090,099, 3,090,100 and 3,206,351, or by the use of fluid needling jets as in U.S. Pat. Nos. 3,214,819; 3,485,706, 3,508,308 and 3,620,903); preferably the fabric has little or no binder which would tend to stiffen the fabric and make it less pliable (less than 30% binder and more preferably below 20%, e.g. 0, 5 or 10% elastomeric binder). Certain fabrics of this type, such as those sold under the names Nexus and Sontara, usually are anisotropic, having considerably higher strengths and moduli in the "machine direction" than in the cross direction; these may be reshaped to make them more isotropic in use or they may be used without reshaping. In the latter case the laminated product will be cut anisotropically (as is done with the leather customarily used for shoe uppers), by the shoe manufacturer, into shoe upper blanks in which the lasting-pulling direction corresponds to the machine direction of the fabric. In either case, the laminate will have a tangent modulus at 20% elongation in the lasting-pulling direction which is significantly higher (e.g. 50% or 100% higher) than that of the microporous layer alone, whether measured at room temperature (e.g. 23° C.) or at elevated temperature (e.g. dry at 80° C. or in steam at 100° C.). The fibers are generally close together; thus as can be seen in FIG. 12B (upper left) a plurality of individual fibers are embedded within a small portion (e.g. 30 microns square) of fused projection material. The Nexus and Sontara fabrics usually have high elongations at break (e.g. about 50% or more, even in the machine directions).

In the foregoing Examples the microporous material is a relatively thick layer having substantial strength in its own right. The invention may be practiced with much thinner microporous layers. Usually the microporous layer will be thicker than about 10 mils (about 0.25 mm) such as about 20, 30 or 40 mils (about 0.5 to 1 mm). With such thinner microporous layers it is desirable, for most purposes, to employ thicker (and stronger) fibrous fabrics (e.g. with a 30 mil thick microporous material one may use a 30 mil thick fibrous fabric weighing about 6 ounces per square yard, such as a fabric made by needle punching polyester fiber through a woven scrim and then impregnating with a latex to add about 20% of butadiene-acrylonitrile copolymer rubber as a binder for the fibrous structure). Generally for shoe uppers an overall thickness within the range of about 40 to 80 mils (about 1 to 2 mm) is desirable for men's shoes and an overall thickness within the range of about 35 to 50 mils (about 0.8 to 1.2 mm) is desirable for women's shoes. For other uses the overall thickness will be different, e.g. for upholstery it may be about 20 to 40 mils (about 0.5 to 1 mm).

For best control in continuous laminating, both the microporous layer and the fibrous fabric may be macroscopically uniform (with each square centimeter being substantially the same as the next square centimeter along the main planes of these materials) and the pattern of projections arising from a base plane of the microporous layer is desirably similarly uniform, although one may of course use an overall pattern in which the arrangements of projections differ in specific form in different areas without differing in their general nature or effect (e.g. a predetermined overall "random" network pattern). And, of course, if one wishes to produce a laminate having predetermined localized non-onto the hot roll 31 which has a surface speed of about 3 feet per minute; it is in contact with the hot roll for about 15 seconds, to preheat the fabric, before it is contacted by the microporous material. The resulting assembly of microporous material and fabric is thereafter on the hot roll for about 20–30 seconds. It then travels over cooling rolls 42, 42A to a windup roll 42B.

The fabric used in this Example is an entangled ("spun-laced") formed non woven fabric of polyester staple fibers, known as non-apertured "Nexus", having a weight of about 1.9 oz./yd.$^2$ made of polyethylene terephthalate fibers (without binder) as described in the article entitled "Nexus: Spunlaced Formed Fabrics" by Guenther, Barnes, May and Riggins in Modern Textiles Magazine December 1973 pages 1–9 (paper presented May 23, 1973 at meeting of N.Y. Chapter of AATT) which had been dyed black, reshaped and heat set as described in that article.

The hot roll has a surface temperature of 375° F. (190° C.). The pressure at the nip is on the order of about 10 to 15 pounds per lineal inch (about 2 to 3 kg/cm) and is such that the effective width of the nip (owing to yielding of the rubber of backup roll 32) is about 1 inch (about 2 to 3 cm). The tension (exerted by the pulling effect of the backing roll) on the microporous material is such that in the processes it stretches about 2½–3% (measured by marking a fixed length of the supply of microporous material and then measuring the distance between those marks in the laminate).

Figure 5:
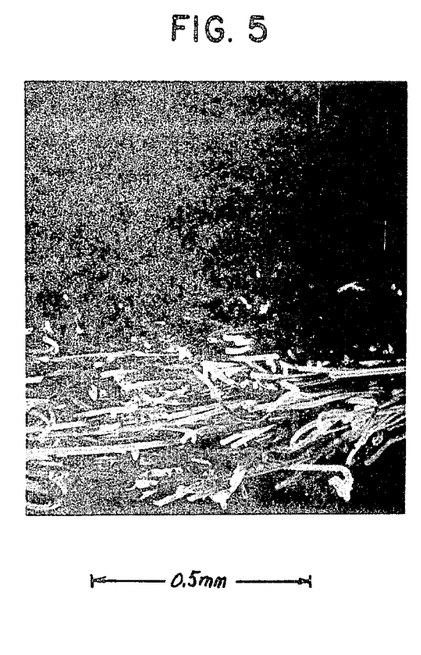
Figure 6:
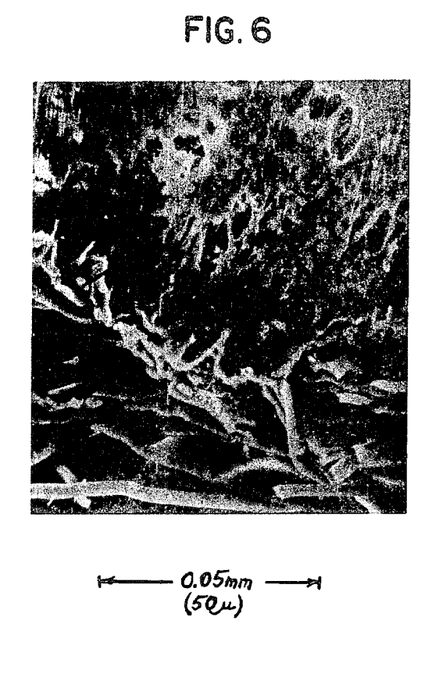
Figure 7:
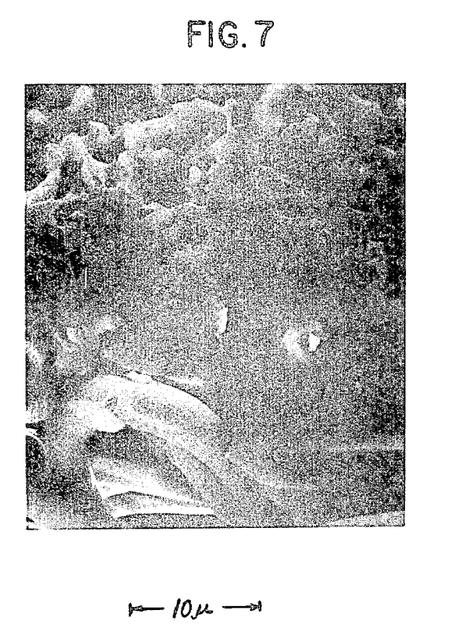

The cross-section of the resulting laminate along the fabric boundary is illustrated in FIGS. 5, 6 and 7. It will be seen that most of the material of the projections has been fused to a less porous condition as indicated at 43, that fibers 44 of the nonwoven fabric are partially or fully embedded therein, and that there are, in this case, zones 46 of substantially the original porosity between the fused zones. The moisture vapor transmission (MVT) characteristics of the original finished microporous material are largely retained. Before laminating, the MVT of that material is 70 g./sq. meter/hr; the MVT of the laminate is 54 g./sq. meter/hr. This indicates that the MVT of the bonded zone is well above 100; that is, MVT is a measurement analogous to conductance and the effect of the bond can be calculated by adding reciprocals of MVT, analogous to resistances, e.g. as follows, using the data given above in this Example: $(1/54)=(1/70)+(1/X)$ where X is the MVT of the bonded zone, giving a result $X=240$. The thicknesses of the non-woven fabric and the microporous sheet (including projections) before laminating are 12 mils (about 0.3 mm) and 63 mils (about 1.6 mm) respectively; the thickness of the laminate is 67 mils (all thicknesses are measured with an Ames 560 series thickness gauge according to ASTM D1814-70). The bond strength and tear strength of the laminate are very good; when it is attempted to pull the fabric and microporous material apart the laminate fails within the fabric indicating that the bond strength is greater than the cohesive strength of the fabric.

The MVT measurements are obtained according to ASTM Method E96-66 except that water is in the cup and silica gel is in the oven, rather than having silica gel in the cup and 90% relative humidity outside the cup.

EXAMPLE 3

Figure 8:
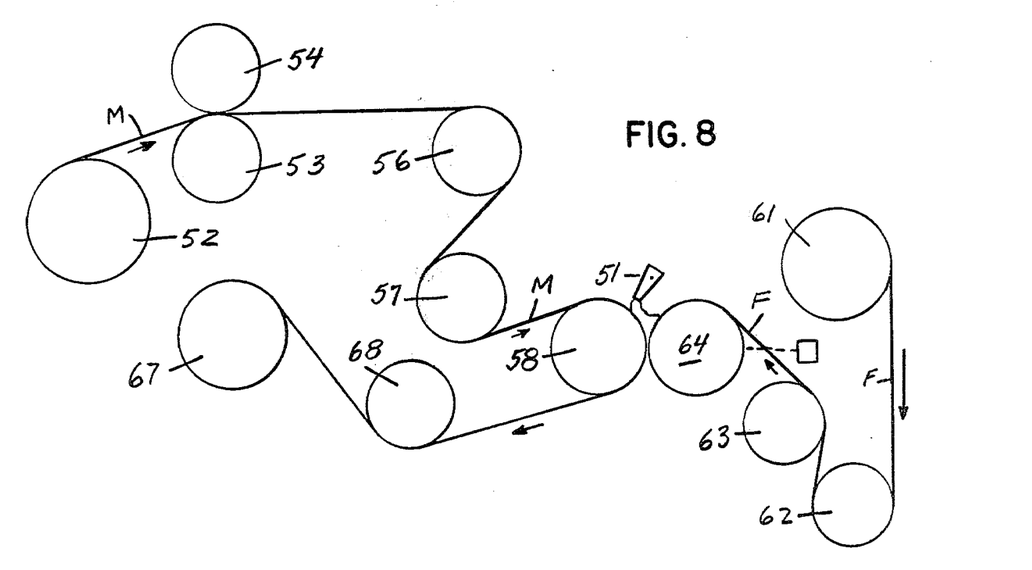

The microporous sheet material produced in Example 1 is laminated to a layer of fibrous fabric using apparatus illustrated in FIG. 8. In this apparatus the microporous material is heated by direct flame from a burner 51 and then brought into contact, under pressure, with the fibrous sheet, in the nip between two rolls. The apparatus is one which is conventionally used for flame-laminating polyurethane foam to fabric; a description of such flame-laminating is found, for example, in the article "Flame Bonding for Laminates" by Brodbeck in Textile Chemist and Colorist 1 (27) 613–618 (1969).

More particularly, the microporous material is unwound from a supply roll 52, passed between a pair of chain driven rolls 53, 54, then over idler rolls 56, 57, and onto a roll 58 on which it is supported while its projections 12 are subjected to a direct gas flame (from the burner 51 situated about 2 inches (5 cm) from those projections). The resulting softened and partially consumed projections are then brought into contact in the nip 59 with the fabric F, which has been fed from its supply roll 61 around wooden spreader idler rolls 62, 63 and over a backup roll 64. Support roll 58 and backup roll 64 are both steel rolls of about 5 inch diameter, positively driven at surface speeds of about 13 yards per minute in synchronism with (same surface speed) the driven rolls 53, 54. The support roll 58 is mounted on fixed bearings while the backup roll 64 is on movable bearings which are connected to an air pressure cylinder 66 which acts to press the backup roll against the support roll at a predetermined fluid pressure which results in a force, at the nip, in the neighborhood of about 20 pounds per lineal inch (about 4 kg/cm).

The flame is a gas flame (e.g. methane gas) which bathes the entire width of the surface of the microporous material over a length of about 3 inches (about 8 cm) (measured downstream of the point of initial flame contact with that surface) and licks at the surface of the fabric entering the nip; thus, at the speed of movement of the materials, the microporous material is in contact with the flame for about ½ second. The flame visibly melts the surface of the microporous material (as shown, for instance, by darkening owing to increased density). When not in contact with the materials (i.e. when the burner is tilted so that the flame extends freely into the air) the flame is about 6 to 8 inches long.

After leaving the nip the resulting laminate is drawn off by a rewind roller 67; during this period it first rests on the surface of the support roller (about 1 second) under a tension which presses the fibrous fabric against the polyurethane layer, then passes through the air to a cooling roll 68.

The fibrous material is the same as that used in Example 2.

Figure 9:
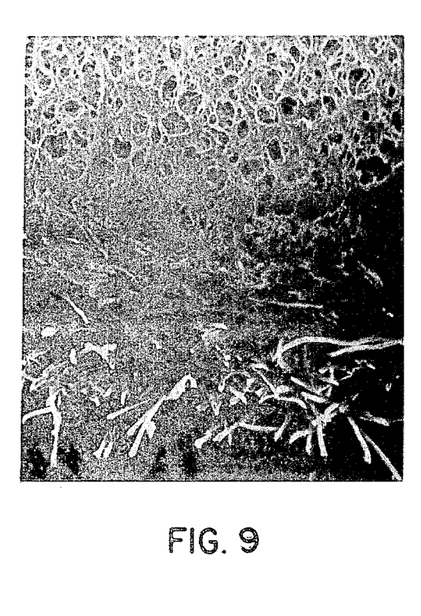
Figure 10:
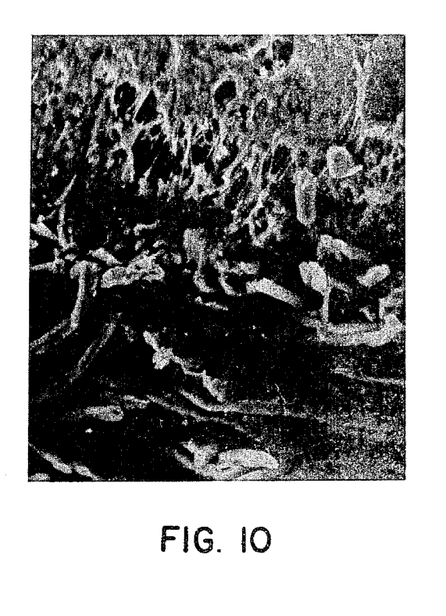
Figure 11:
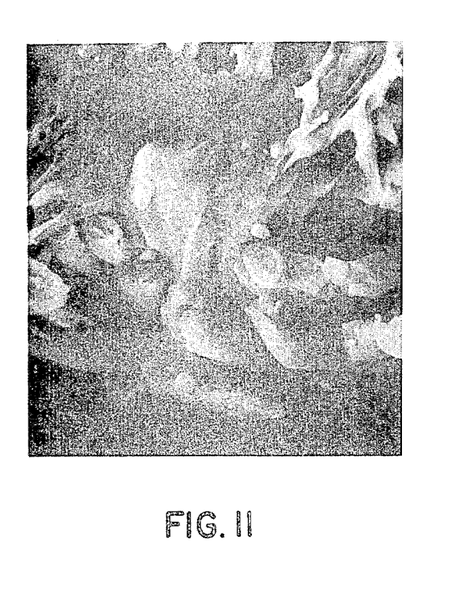

A cross section of the resulting laminate is known in FIGS. 9, 10, and 11. It will be seen (compare FIG. 1) that a substantial proportion of the lower-melting microporous layer containing the projections 12 has been at least partially fused and densified and possibly partially burned off and that fibers 44 are partially or fully embedded therein. The thickness of the laminate is 63 mils (measured as in Example 2); this indicates (by comparison with Example 2) that the flame may have burned off about 4 mils (0.1 mm) or more of the microporous material. The MVT of the laminate is about the same, or higher than, that of the product of Example 2; one test indicates that it is equal to that of the unlaminated microporous starting material. The laminate shows very good bond strength and tear strength, as in Example 2. It behaves very well in practical shoe making; the uppers conform very well to the last, delamination does not occur in the shoe making process, and the uniformity of bond, the patterns in different areas may differ considerably in their general nature.

The top surface of the microporous material may be given a surface finish (as in Ex. 1) prior to lamination. More desirably it is given a finishing treatment after lamination. One suitable type of finish involves applying, as by spraying or printing, a thin skin of elastomeric polyurethane. The presence of this skin usually reduces the MVT somewhat; thus the material of Example 1 (having an MVT of about 70 after finishing) has an MVT of about 200 g/sq.m/hr. in the absence of the finish.

The preferred microporous materials are produced by coagulating at least one layer of a solution of elastomeric polyurethane in a liquid solvent (e.g. by contacting the layer of solution with a non-solvent or coagulant which is miscible with said solvent); methods of this type are well known in the art. As indicated, a temporary support used in this process may have a surface so patterned as to form the projections during this process. The temporary support need not be a fabric; it may, of instance, be a coagulant-permeable plastic having apertures, or valleys, for forming the projections. The microporous structure generally has a specific gravity in the range of about 0.3 to 0.5. This provides a material which can be given a good finish, with a good break (especially when the specific gravity of its upper surface to be finished is in the range of about 0.3 to 0.4) and a pleasant pliable band, with good strength.

While the Examples employ a microporous material whose projections are of a material having a specific gravity of about 0.3 or more, it will be understood that it is within the broader scope of the invention to use a lower layer whose projections have still lower specific gravity. Thus one may form the lower layer (which may be discontinuous, e.g. composed only of spaced projections integral with, but arising out of, a denser layer) from a paste of polyurethane solution and salt (or other removable filler) having such a high salt (or solvent) content that the specific gravity of the porous material of the lower layer is less than 0.3 (such as 0.25 or 0.2 or even less), or by using sufficient blowing agent or gas in the material from which the projections are formed (when the product is made by blowing or aerating). In still broader aspects of the invention, one may use a material having a lower layer whose solid projections are not microporous, or a lower layer which is not formed into projections but which is so porous that its overall specific gravity is below 0.2 such as 0.15 or 0.1 or 0.07. The solid material of the projections may be added to a surface of microporous material after that microporous structure has been formed. For instance, a lower-melting elastomeric polyurethane (m.p. 140°–145° C.) may be formed into a macroapertured lacelike web about 3 to 5 mils (about 0.08 to 0.13 mm) thick weighing about 0.5 to 0.8 oz/yd$^2$ (about 17 to 27 g/m$^2$) such as about 0.55 to 0.65 oz/yd$^2$ (about 18 to 22 g/m$^2$) whose open spaces are less than 10 mm across, and the resulting thin web of the network material may be laid onto a flat (i.e. unpatterned) surface of the microporous polyurethane material and heat applied (while retaining the network in position on the microporous sheet material) to cause the network to become tacky and bond firmly to the microporous surface at the lines of contact.

Most desirably the fusion of the projections is effected by heat alone, but it is within the broader scope of the invention to apply, to outer portions of the projections, a fusion-promoting agent (such as a solvent for the material of the projections) which acts to lower the fusion temperature during the laminating process and which is preferably sufficiently volatile that it is driven off by heat applied when, or after, the microporous layer and the fibrous fabric are brought into contact with each other.

As indicated above the porous polymer layer is preferably made of elastomeric polyurethane. It will be understood that other flexible polymeric materials, particularly of an elastomeric nature, may be used. It will also be understood that the lower layer having the projections (or of very low specific gravity) may be of a heat-tackifiable material of the same nature, or different from, the material of the main layer.

It is understood that the foregoing detailed description is given merely by way of illustration and that variations may be made therein without departing from the spirit of the invention.

I claim:

1. Process for laminating a microporous flexible solid sheet material having a specific gravity of at least 0.3 to a fibrous fabric which comprises supplying said sheet material in a form having a surface layer at least 0.1 mm thick having an overall specific gravity less than 0.2, applying heat to said surface layer by bathing it in a flame to fuse material of said surface layer and then pressing said fused material against said fibrous fabric to embed fibers of said fabric into said fused material to form a flexible laminate in which the bond between said fibrous fabric and said microporous material has high moisture vapor transmission.

2. Process as in claim 1 in which said surface layer is made up of projections which are arranged in a spaced or open pattern, the material of said projections having a specific gravity of more than 0.2.

3. Process as in claim 2 in which the material of said projections is microporous and has a specific gravity of at least about 0.3.

4. Process as in claim 3 in which said sheet material, including said projections, is a product produced by spreading at least one layer of a solution of elastomeric polyurethane in a liquid solvent therefor onto a temporary support having a pattern which is the negative of the pattern of said projections, coagulating said layer and removing said solvent.

5. Process as in claim 2 in which said projections are spaced at least 0.2 mm apart and are at least 0.1 mm wide and are more than 0.1 mm in height and provide a surface layer at least 0.1 mm thick having an overall specific gravity less than 0.2.

6. Process as in claim 4 in which said temporary support is a woven fabric belt having a regular pattern.

7. Process as in claim 4 in which sheet material has two opposite faces, one being bathed in said flame, and the other being provided with an embossed thin skin of elastomeric polyurethane, said projections are spaced at least 0.2 mm apart and are at least 0.1 mm wide and are more than 0.1 mm in height and provide a surface layer at least 0.1 mm thick having an overall specific gravity less than 0.2, and said temporary support is a woven fabric belt having a regular pattern.

8. Product of the process of claim 7.

9. Process as in claim 1 in which said sheet material has two opposite faces, one being bathed in said flame and the other being provided with an embossed thin skin of elastomeric polyurethane.

10. Product of the process of claim 9.

11. Product of the process of claim 1.

12. Process for laminating a microporous flexible solid sheet material having a specific gravity of at least 0.3 to a fibrous fabric which comprises supplying said sheet material in a form having a surface having projections arranged in a spaced or open pattern, the material of said projections having a specific gravity of more than 0.2, applying heat to said projections by bathing them in a flame to fuse material of said projections and then pressing said fused material against said fibrous fabric to embed fibers of said fabric into said fused material to form a flexible laminate in which the bond between said fibrous fabric and said microporous material has high moisture vapor transmission.

13. Process as in claim 12 in which said sheet material, including said projections, is a product produced by spreading at least one layer of a solution of elastomeric polyurethane in a liquid solvent therefor onto a temporary support having a pattern which is the negative of the pattern of said projections, coagulating said layer and removing said solvent.

14. Product of the process of claim 13.

15. Process as in claim 12 in which said sheet material has two opposite faces, one being bathed in said flame and the other being provided with an embossed thin skin of elastomeric polyurethane.

16. Product of the process of claim 12.

* * * * *